(12) United States Patent
Takeuchi et al.

(10) Patent No.: US 11,732,124 B2
(45) Date of Patent: Aug. 22, 2023

(54) COMPOUND AND TABLET

(71) Applicant: HITACHI CHEMICAL COMPANY, LTD., Tokyo (JP)

(72) Inventors: Kazumasa Takeuchi, Tokyo (JP); Chio Ishihara, Tokyo (JP); Hideo Maeda, Tokyo (JP); Masahiko Osaka, Tokyo (JP); Takashi Inagaki, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 272 days.

(21) Appl. No.: 16/767,442

(22) PCT Filed: Nov. 30, 2017

(86) PCT No.: PCT/JP2017/043194
§ 371 (c)(1),
(2) Date: May 27, 2020

(87) PCT Pub. No.: WO2019/106813
PCT Pub. Date: Jun. 6, 2019

(65) Prior Publication Data
US 2020/0385566 A1    Dec. 10, 2020

(51) Int. Cl.
C08L 63/00 (2006.01)
H01F 1/153 (2006.01)
C08L 91/06 (2006.01)
C08K 3/08 (2006.01)

(52) U.S. Cl.
CPC .............. *C08L 63/00* (2013.01); *C08L 91/06* (2013.01); *H01F 1/153* (2013.01); *C08K 2003/0856* (2013.01); *C08L 2203/20* (2013.01); *C08L 2205/03* (2013.01)

(58) Field of Classification Search
CPC ...... C08L 63/00; C08L 91/06; C08L 2203/20; C08L 2205/03; H01F 1/153; C08K 2003/0856; C08G 59/686; C08G 8/10; C08G 59/621; C08G 59/68
See application file for complete search history.

(56) References Cited

U.S. PATENT DOCUMENTS

2015/0144835 A1    5/2015    Kosugi

FOREIGN PATENT DOCUMENTS

| CN | 106967208 A | 7/2017 |
|---|---|---|
| JP | S50-052107 A | 5/1975 |
| JP | S55-082147 A | 6/1980 |
| JP | S58-122705 A | 7/1983 |
| JP | H8-273916 A | 10/1996 |
| JP | 2001-214035 A | 8/2001 |
| JP | 2003-201386 A | 7/2003 |
| JP | 2003-261745 A | 9/2003 |
| JP | 2004-031786 A | 1/2004 |
| JP | 2007-091813 A | 4/2007 |
| JP | 2008-214428 A | 9/2008 |
| JP | 2009-260116 A | 11/2009 |
| JP | 2011-012125 A | 1/2011 |
| JP | 2012-067262 A | 4/2012 |
| JP | 2013-212642 A | 10/2013 |
| JP | 2014-013803 A | 1/2014 |
| JP | 2016-012671 A | 1/2016 |
| JP | 2016-153513 A | 8/2016 |
| JP | 2017-107935 A | 6/2017 |
| JP | 2017107935 A | 6/2017 |
| JP | 2017-135342 A | 8/2017 |
| JP | 2017-203579 A | 11/2017 |
| JP | 2019-080060 A | 5/2019 |
| WO | 2017/010403 A1 | 1/2017 |
| WO | 2017/107935 A1 | 6/2017 |

OTHER PUBLICATIONS

English translation of JP2001214035 (Year: 2001).*
English Translation of JP2017107935 (Year: 2017).*
Victoria Neufeldt, Webster's New World Dictionary of American English Third College Edition, p. 247, 1988, Simon & Schuster, Inc., New York, New York.
Shigeko Asano, "Plaintiff's Evidence No. 8:Gas Chromatography of Montan Wax", Reports of the Central Customs Laboratory Issue: 16, 1976, p. 49-p. 55 (cited in an office action dated Nov. 30, 2022 in counterpart JP Patent Application No. P2019-556499) with partial English translation.
"Plaintiffs Evidence No. 9:Licocare® Licowax® Ceridust® Licolub® Licomont® Licocene®", Clariant Chemicals Co., Ltd. Additives Business Unit, Mar. 31, 2016 (cited in an office action dated Nov. 30, 2022 in counterpart JP Patent Application No. P2019-556499) with partial English translation.
Soichi Muroi, Hidekazu Ishimura, "Plaintiffs Evidence No. 11: Epoxy Resin: An Introduction (Reprinting)", The Japan Society of Epoxy Resin Technology, Sep. 16, 2017 (cited in an office action dated Nov. 30, 2022 in counterpart JP Patent Application No. P2019-556499) with partial English translation.
Shikoku Chemicals Corporation, "Plaintiffs Evidence No. 13:Curezol(Imidazole-based epoxy resin curing agent)", Sep. 30, 2016 (cited in an office action dated Nov. 30, 2022 in counterpart JP Patent Application No. P2019-556499) with partial English translation.
Shikoku Chemicals Safety Data Sheet, "Plaintiffs Evidence No. 14:1. Chemical Product and Corporate Information/Name of chemical product: Curezol C17Z", Date of publication: Jun. 9, 2021, Jun. 9, 2021, p. 1-p. 6 (cited in an office action dated Nov. 30, 2022 in counterpart JP Patent Application No. P2019-556499) with partial English translation.
Editor: Dictionary of Plastics Technology Editorial Committee Publisher: Yukio Shimura, "Plaintiffs Evidence No. 15: Crystal <-> amorphous", Dictionary of Plastics Technology, Oct. 7, 1994, p. 203 (cited in an office action dated Nov. 30, 2022 in counterpart JP Patent Application No. P2019-556499) with partial English translation.

(Continued)

Primary Examiner — Andrew J. Oyer
(74) Attorney, Agent, or Firm — Fitch, Even, Tabin & Flannery, LLP

(57) ABSTRACT

A compound comprises a resin composition containing an epoxy resin, a phenol resin, a wax, and an imidazole compound, and a metal element-containing powder, wherein the epoxy resin comprises a crystalline epoxy resin, the wax comprises a montanic acid ester, and the content of the metal element-containing powder is 90 mass % or more based on the total mass of the compound.

15 Claims, No Drawings

(56) References Cited

OTHER PUBLICATIONS

Mitsubishi Chemical Group Epoxy Business Division Mitsubishi Chemical Corporation, "Plaintiff's Evidence No. 16: Product Guide", Product Guide, Oct. 2022, p. 7 (cited in an office action dated Nov. 30, 2022 in counterpart JP Patent Application No. P2019-556499) with partial English translation.

Nippon Kayaku Co., Ltd. Functional Chemistry Business Department, Functional Materials Business Division, "Plaintiff's Evidence No. 17:Epoxy Resins Reactive Flame Retardants Hardeners", Thermosetting Resins 12th Edition, Feb. 2014 (cited in an office action dated Nov. 30, 2022 in counterpart JP Patent Application No. P2019-556499) with partial English translation.

DIC Corporation Polymer Technical Div.1, Polymer Technical Group 5, "Plaintiff's Evidence No. 18:Introduction to Epoxy Resins for Use in Composite Materials (Comparison data of Epoxy / DDS cure)", Color & Comfort, Jun. 2018 (cited in an office action dated Nov. 30, 2022 in counterpart JP Patent Application No. P2019-556499) with partial English translation.

\* cited by examiner

COMPOUND AND TABLET

CROSS-REFERENCE TO RELATED APPLICATIONS

This application is a U.S. national phase application filed under 35 U.S.C. § 371 of International Application No. PCT/JP2017/043194, filed Nov. 30, 2017, designating the United States, which is hereby incorporated herein by reference in its entirety.

TECHNICAL FIELD

The present invention relates to a compound and a tablet.

BACKGROUND ART

A compound containing a metal powder and a resin composition is used as a raw material of various industrial products such as inductors, electromagnetic wave shields, or bonded magnets corresponding to various physical properties of the metal powder (refer to Patent Literatures 1 and 2 described below).

An inductor makes high frequency components difficult to pass therethrough and therefore is used as a filter and for noise removal, smoothing, etc., in a power supply circuit. Examples of the structural classification of inductors includes a winding type, a laminate type, and a thin-film type, and in large current applications such as DC-DC converters, a winding inductor is used in many cases. In recent years, along with the high-density mounting in electronic equipment, downsizing of inductors is also required. The downsizing, however, reduces the volume of the core of an inductor (core consisting of a magnetic material), so that the DC superimposition characteristics (inductance at a direct current load) tend to be degraded. An inductor without causing degradation of the DC superimposition characteristics even when downsized is therefore required.

In the following Patent Literature 3, a technology relating to a molded coil having a structure for sealing a coil with a magnetic mold resin (a resin in which a magnetic powder is dispersed) is disclosed, and it is said that excellent DC superimposition characteristics can be obtained (paragraph [0011] in the same Literature). Also, in the following Patent Literature 4, an inductor made from soft magnetic alloy powder which causes no variation in sealing is disclosed.

CITATION LIST

Patent Literature

Patent Literature 1: Japanese Unexamined Patent Publication No. 2004-31786
Patent Literature 2: Japanese Unexamined Patent Publication No. H8-273916
Patent Literature 3: Japanese Unexamined Patent Publication No. 2009-260116
Patent Literature 4: Japanese Unexamined Patent Publication No. 2014-013803

SUMMARY OF INVENTION

Technical Problem

However, conventional compounds used for the inductors described above or the like have difficulty to achieve all the characteristics such as fluidity, releasability from a mold, molding burr reduction and mechanical strength of a molded product at a high level.

Accordingly, an object of the present invention is to provide a compound excellent in fluidity and releasability from a mold which enables molding burrs to be reduced and mechanical strength of the molded product to be enhanced, and another object is to provide a tablet made from the compound.

Solution to Problems

A compound according to one aspect of the present invention comprises a resin composition containing an epoxy resin, a phenol resin, a wax and an imidazole compound, and a metal element-containing powder, wherein the epoxy resin comprises a crystalline epoxy resin, the wax comprises a montanic acid ester, and the content of the metal element-containing powder is 90 mass % or more based on the total mass of the compound.

In one aspect of the present invention, the crystalline epoxy resin may comprise at least one selected from the group consisting of a biphenyl-type epoxy resin and a biphenyl aralkyl-type epoxy resin.

In one aspect of the present invention, the metal element-containing powder may comprise an amorphous Fe alloy powder.

In one aspect of the present invention, the imidazole compound may comprise an imidazole compound having an alkyl group with 8 or more carbon atoms.

The compound according to an aspect of the present invention may be used for an inductor.

The compound according to an aspect of the present invention may be used for transfer molding.

The tablet according to another aspect of the present invention is formed by using the compound according to an aspect of the present invention.

Advantageous Effects of Invention

According to the present invention, a compound excellent in fluidity and releasability from a mold which enables molding burrs to be reduced and mechanical strength of the molded product to be enhanced, and a tablet made from the compound can be provided.

DESCRIPTION OF EMBODIMENTS

Preferred embodiments of the present invention are described in detail as follows. The present invention, however, is not limited to the following embodiments.

A compound according to the present embodiment comprises a resin composition containing an epoxy resin, a phenol resin, a wax, and an imidazole compound, and a metal element-containing powder. In the compound according to the present embodiment, the epoxy resin comprises a crystalline epoxy resin and the wax comprises a montanic acid ester. The content of the metal element-containing powder in the compound according to the present embodiment is 90 mass % or more based on the total mass of the compound. Having the composition described above, the compound according to the present embodiment is excellent in fluidity and releasability from a mold and enables molding burrs to be reduced and a molded product excellent in mechanical strength to be formed. The compound according to the present embodiment can be suitably used as a material for an inductor (e.g., a magnetic core).

The use of the compound according to the present embodiment is not limited to the magnet core of an inductor. Depending on the composition or combination of the metal element-containing powder contained in the compound, various physical properties such as electromagnetic characteristics or thermal conductivity of the compound can be freely controlled, so that the compound can be used for various industrial products or raw materials thereof. The industrial products manufactured using the compound may be, for example, automobiles, medical equipment, electronic equipment, electric equipment, information and communication equipment, home appliances, audio equipment, and general industrial equipment. For example, in the case of a compound containing a soft magnetic powder such as from Fe—Si—Cr alloy or ferrite as metal element-containing powder, the compound may be used as a material (for example, a magnetic core) of the inductor described above (for example, EMI filter). In the case of a compound containing a permanent magnet as the metal element-containing powder, the compound may be used as a raw material for a bonded magnet. In the case of a compound containing iron and copper as the metal element-containing powder, a molding (for example, a sheet) formed from the compound may be used as an electromagnetic wave shield.

Hereinafter, the components of the compound according to the present embodiment and requirements of the manufacturing method are described step by step.

[Resin Composition]

The resin composition comprises components which may include a resin, a curing agent, a curing accelerator and an additive, and may be remaining components (nonvolatile components) other than an organic solvent and a metal element-containing powder. The additive is a balance component other than the resin, the curing agent and the curing accelerator in the resin composition. The additive is, for example, a wax, a coupling agent or a flame retardant. In the compound according to the present embodiment, the resin composition contains at least an epoxy resin as the resin, a phenol resin as the curing agent, an imidazole compound as the curing accelerator, and a wax. Furthermore, the epoxy resin comprises a crystalline epoxy resin, and the wax comprises a montanic acid ester.

A resin composition has a function as a binder of the metal element-containing powder and imparts mechanical strength to a molding formed from the compound. For example, in forming of the compound at high pressure using a mold, gaps between metal element-containing powders are filled with the resin composition, so that the metal element-containing powders are bound to each other. By curing the resin composition in the molding, the cured product of the resin composition binds metal element-containing powders to each other more firmly, so that the mechanical strength of the molding is enhanced. Also, since the resin composition contains a wax, mixing of the metal element-containing powder with the wax-containing resin composition enables the wax and other components of the resin composition other than the wax to be attached and formed on the surface of the metal element-containing powder. The wax and other components of the resin composition may cover the entire surface of the metal element-containing powder or may partially cover the surface of the metal element-containing powder. During high-pressure molding, gaps between metal element-containing powders are filled with the wax and other components of the resin composition formed on the surface of the metal element-containing powder, so that the metal element-containing powders can be bound to each other to make a tablet. The tablet is then subjected to a molding step including heating and pressure application to make a cured product, and the resin composition functions as a strong binder. In the case of using the tablet as a material of an inductor, the tablet is subjected to the molding step to make a cured product surrounding the circumference of a coil as inductor component.

(Wax)

In the present embodiment, the wax is mixed with the metal element-containing powder and other components of the resin composition other than the wax to be attached and formed on the surface of the metal element-containing powder. The wax and other components of the resin composition may cover the entire surface of the metal element-containing powder or may partially cover the surface of the metal element-containing powder. Also, it is preferable that the wax dissolve a part or all of the curing accelerator. Thereby, the thermal aging of the compound and the tablet can be suppressed. The wax liquefies in a molding step including heating and pressure application to impart fluidity to the compound for improvement in the moldability, and separates from the metal element-containing powder and other components of the resin composition to function as a releasing agent for enhancement of the releasability from a mold. Along with liquefaction of the wax, the curing accelerator dissolved in the wax accelerates curing of the resin composition, and the wax separates from the other components of the resin composition, so that the resin composition excluding the wax functions as a strong binder.

The wax used in the present embodiment comprises at least a montanic acid ester (montan wax). A montan wax is more effective in improving the fluidity and releasability of the compound than other waxes and also excellent in the effect of reducing molding burrs and the effect of improving the mechanical strength of a molding.

The wax may comprise waxes other than a montan wax. Examples the other waxes include fatty acids such as stearic acid, 12-oxystearic acid and lauric acid; fatty acid salts such as zinc stearate, calcium stearate, barium stearate, aluminum stearate, magnesium stearate, calcium laurate, zinc linoleate, calcium ricinolate, and zinc 2-ethylhexanoate; fatty acid amides such as stearic acid amide, oleic acid amide, erucic acid amide, behenic acid amide, palmitic acid amide, lauric acid amide, hydroxystearic acid amide, methylenebis stearic acid amide, ethylenebis stearic acid amide, ethylenebis lauric acid amide, distearyl adipic acid amide, ethylenebis oleic acid amide, dioleyl adipic acid amide, N-stearyl stearic acid amide, N-oleyl stearic acid amide, N-stearyl erucic acid amide, methylol stearic acid amide, and methylol behenic acid amide; fatty acid esters such as butyl stearate; alcohols such as ethylene glycol and stearyl alcohol; polyethers such as polyethylene glycol, polypropylene glycol, polytetramethylene glycol and modified products thereof; polysiloxanes such as a silicone oil and a silicone grease; fluorides such as a fluorine-based oil, a fluorine-based grease, and a fluororesin-containing powder; and waxes such as a paraffin wax, a polyethylene wax, an amide wax, a polypropylene wax, an ester wax, a carnauba wax, and a micro wax. One of these may be used alone, or two or more of these may be used in combination.

Examples of commercial products of the montan wax include Licowax E, Licowax OP, Recolube E, and Recolube WE40 (trade names, manufactured by Clariant Chemicals Co., Ltd.). Examples of commercial products of polyethylene wax include Recolube H12, Licowax PE 520, Licowax PED 191 (trade names, manufactured by Clariant Chemicals Co., Ltd.). Examples of commercial products of amide wax include Recolube FA1 (trade name, manufactured by Clariant Chemicals Co., Ltd.) and DISPARLON 6650 (trade name, manufactured by Kusumoto Chemicals, Ltd.).

The wax may be appropriately selected corresponding to the requirements in design of the compound such as the fluidity, the releasability, and the molding temperature and pressure of the compound, and the melting point of the wax. From the viewpoint of further satisfying these requirements, Licowax E (drop point: 82° C., melt viscosity: 30 mPa·s (100° C.)) is particularly preferred among them.

The wax content in the compound according to the present embodiment may be preferably 0.3 to 1.2 mass %, more preferably 0.4 to 1.0 mass %, still more preferably 0.5 to 0.9 mass % based on the total mass of the compound. With a wax content of 0.3 mass % or more, the effect of improving the fluidity and the releasability of the compound, the effect of reducing the molding burrs, and the effect of enhancing the mechanical strength of a molding tend to be obtained at a higher level. With a wax content of 1.2 mass % or less, reduction in the moldability of the compound and the mechanical strength of a molding due to an excessive amount of the wax is easily suppressed. However, even with a wax content out of the above range, the effects of the present invention can be obtained. In the present specification, the total mass of the compound means the total mass of components excluding volatile components such as organic solvents (nonvolatile components).

(Epoxy Resin)

The epoxy resin used in the present embodiment may be, for example, a resin having two or more epoxy groups in one molecule, and comprises at least a crystalline epoxy resin. Though having a relatively low molecular weight, the crystalline epoxy resin has a relatively high melting point and is excellent in fluidity. Also, the epoxy resin may comprise an epoxy resin other than the crystalline epoxy resin (non-crystalline epoxy resin).

Specific examples of the epoxy resin include a biphenyl-type epoxy resin, a biphenyl aralkyl-type epoxy resin, a stilbene-type epoxy resin, a diphenylmethane-type epoxy resin, a sulfur atom-containing epoxy resin, a novolac-type epoxy resin, a dicyclopentadiene-type epoxy resin, a salicylaldehyde-type epoxy resin, a copolymer of naphthols and phenols-type epoxy resin, an epoxidized aralkyl-type phenol resin, a bisphenol-type epoxy resin, a glycidyl ether of alcohols-type epoxy resin, a glycidyl ether of paraxylylene and/or metaxylylene modified phenol resin-type epoxy resin, a glycidyl ether of terpene modified phenol resin-type epoxy resin, a cyclopentadiene-type epoxy resin, a glycidyl ether of polycyclic aromatic ring modified phenol resin-type epoxy resin, a glycidyl ether of naphthalene ring-containing phenol resin-type epoxy resin, a glycidyl ester-type epoxy resin, a glycidyl-type or methyl glycidyl-type epoxy resin, an alicyclic epoxy resin, a halogenated phenol novolac-type epoxy resin, an ortho cresol novolac-type epoxy resin, a hydroquinone-type epoxy resin, a trimethylolpropane-type epoxy resin, and a linear aliphatic epoxy resin obtained by oxidizing an olefin bond with a peroxy acid such as peracetic acid. One of these may be used alone, or two or more of these may be used in combination.

Examples of the crystalline epoxy resin (highly crystalline epoxy resin) include a hydroquinone-type epoxy resin, a bisphenol-type epoxy resin, a thioether-type epoxy resin, a biphenyl-type epoxy resin, and a biphenyl aralkyl-type epoxy resin. Examples of the crystalline epoxy resin which is available include GK-4292 (melting point: 120° C., melt viscosity: 0.14 Pa·s (150° C.)), GK-5079 (melting point: 78° C., melt viscosity: 0.08 Pa·s (150° C.)), GK-4299 (melting point: 90° C., melt viscosity: 0.19 Pa·s (150° C.)), GK-8001 (melting point: 115° C., melt viscosity: 0.18 Pa·s (150° C.)), GK-4137 (melting point: 80° C., melt viscosity: 0.06 Pa·s (150° C.)), YDC-1312 (melting point: 138 to 145° C., melt viscosity: 0.01 Pa·s (150° C.)), YSLV-80XY (melting point: 75 to 85° C., melt viscosity: 0.01 Pa·s (150° C.)), and YSLV-120TE (melting point: 115 to 125° C., melt viscosity: 0.1 Pa·s (150° C.)), (trade names, manufactured by Nippon Steel & Sumikin Chemical Co., Ltd.); YX-4000 (melting point: 105° C., melt viscosity: 0.2 Pa·s (150° C.)), YX-4000H (melting point: 105° C., melt viscosity: 0.2 Pa·s (150° C.)), YL4121H (melting point: 105° C., melt viscosity: 0.15 Pa·s (150° C.)), and YX-8800 (melting point: 109° C., melt viscosity: 0.2 Pa·s (150° C.)) (trade names, manufactured by Mitsubishi Chemical Corporation); Epiclon 860, Epiclon 1050, Epiclon 1055, Epiclon 2050, Epiclon 3050, Epiclon 4050, Epiclon 7050, Epiclon HM-091, Epiclon HM-101, Epiclon N-730A, Epiclon N-740, Epiclon N-770, Epiclon N-775, Epiclon N-865, Epiclon HP-4032D, Epiclon HP-7200L, Epiclon HP-7200, Epiclon HP-7200H, Epiclon HP-7200HH, Epiclon HP-7200HHH, Epiclon HP-4700, Epiclon HP-4710, Epiclon HP-4770, Epiclon HP-5000, Epiclon HP-6000, and N500P-2 (trade names, manufactured by DIC Corporation); NC3000, NC3000-L, NC3000-H, NC3100, CER3000-L, NC2000-L, XD1000, NC7000-L, NC7300-L, EPPN-501H, EPPN-501HY, EPPN-502H, EOCN-1020, EOCN-102S, EOCN-103S, EOCN-104S, CER-1020, EPPN-201, BREN-S, and BREN-10S (trade names, manufactured by Nippon Kayaku Co., Ltd.). One of these may be used alone, or two or more of these may be used in combination. Among the epoxy resins described above, a biphenyl-type epoxy resin and a biphenyl aralkyl-type epoxy resin are suitable from the viewpoint of further improving the fluidity of the compound and the mechanical strength of a molding, and NC3000-H and YX-4000H are suitable as commercially available products.

The epoxy resin content in the compound according to the present embodiment may be preferably 1.5 to 3.5 mass %, more preferably 2.0 to 3.5 mass %, still more preferably 2.5 to 3.0 mass %, based on the total mass of the compound. With an epoxy resin content of 1.5 mass % or more, the fluidity of the compound and the mechanical strength of a molding is easily further improved. With an epoxy resin content of 3.5 mass % or less, the magnetic properties of a molding tend to be better. However, even with an epoxy resin content out of the range described above, the effect of the present invention can be obtained.

(Phenol Resin)

A phenol resin functions as the curing agent for epoxy resins. Although the phenol resin is not particularly limited, an epoxy resin cured with a low temperature- to room temperature-curing type phenol resin tends to make a soft cured product with a low glass transition point, in general. As a result, a molding formed from the compound also is liable to be softer. It is, therefore, preferable to use a heat-curing phenol resin as the phenol resin which cures an epoxy resin by heating, and it is more preferable to use a phenol novolac resin. Use of a phenol novolac resin allows to easily obtain a cured product of an epoxy resin having a high glass transition temperature, so that a molding (e.g., an inductor) excellent in heat resistance and mechanical strength can be manufactured.

The phenol resin may be, for example, at least one selected from the group consisting of an aralkyl-type phenol resin, a dicyclopentadiene-type phenol resin, a salicylaldehyde-type phenol resin, a novolac-type phenol resin, a copolymer-type phenol resin of a benzaldehyde-type phenol and an aralkyl-type phenol, a paraxylylene and/or metaxylylene modified phenol resin, a melamine modified phenol resin, a terpene modified phenol resin, a dicyclopentadiene-type naphthol resin, a cyclopentadiene modified phenol resin, a polycyclic aromatic ring modified phenol resin, a biphenyl-type phenol resin, and a triphenylmethane-type phenol resin. The phenol resin may be a copolymer composed of two or more of the above. As a commercial product of the phenol resin, for example, Tamanol 758 or 759 manufactured by Arakawa Chemical Industries, Ltd., or HP-850N manufactured by Hitachi Chemical Co., Ltd. may be used. One of these may be used alone, or two or more of these may be used in combination.

The phenol novolac resin may be, for example, a resin obtained by condensation or co-condensation of a phenol and/or a naphthol with an aldehyde under an acid catalyst. The phenol constituting the phenol novolac resin may be, for example, at least one selected from the group consisting of phenol, cresol, xylenol, resorcin, catechol, bisphenol A, bisphenol F, phenylphenol and aminophenol. The naphthol constituting the phenol novolac resin may be, for example, at least one selected from the group consisting of α-naphthol, β-naphthol and dihydroxynaphthalene. The aldehyde constituting the phenol novolac resin may be, for example, at least one selected from the group consisting of formaldehyde, acetaldehyde, propionaldehyde, benzaldehyde and salicylaldehyde.

The phenol resin may be, for example, a compound having two phenolic hydroxyl groups in one molecule. The compound having two phenolic hydroxyl groups in one molecule may be, for example, at least one selected from the group consisting of resorcin, catechol, bisphenol A, bisphenol F, and substituted or unsubstituted biphenol.

In the resin composition, the ratio of active groups (phenolic OH groups) in the phenol resin which react with the epoxy groups in the epoxy resin may be preferably 0.5 to 1.5 equivalents, more preferably 0.8 to 1.2 equivalents, still more preferably 0.9 to 1.1 equivalents, relative to 1 equivalent of the epoxy group in the epoxy resin. With a ratio of the active groups in the phenol resin of less than 0.5 equivalents, the curing rate of the resin composition (epoxy resin) tends to decrease. Also, with a ratio of the active groups in the phenol resin of less than 0.5 equivalents, the glass transition temperature of the resulting cured product may be low, or the sufficient elastic modulus of the cured product may not be obtained. On the other hand, with a ratio of active groups in the phenol resin of more than 1.5 equivalents, the mechanical strength of a molding formed from the compound after curing tends to decrease. However, even with a ratio of active groups in the phenol resin out of the range described above, the effects of the present invention can be obtained.

The resin composition may comprise a curing agent other than a phenol resin. Examples of the other curing agent include curing agents which cure epoxy resins in the range of low temperature to room temperature such as an aliphatic polyamine, a polyaminoamide, and a polymercaptan, and thermal curing agents such as an aromatic polyamine, an acid anhydride, and a dicyandiamide (DICY). One of these may be used alone, or two or more of these may be used in combination.

The phenol resin content in the compound according to the present embodiment may be preferably 0.6 to 2.5 mass %, more preferably 0.8 to 2.2 mass %, still more preferably 1.0 to 2.0 mass %, based on the total mass of the compound. With a phenol resin content of 0.6 mass % or more, the mechanical strength of a molding is easily further improved. With a phenol resin content of 2.5 mass % or less, the magnetic properties of a molding tend to be better. However, depending on the equivalent to the epoxy resin for use, the effects of the present invention can be obtained even with a phenol resin content out of the range described above.

(Curing Accelerator)

The curing accelerator is, for example, a component which reacts with an epoxy resin to accelerate the curing of the epoxy resin. The curing accelerator for use in the present embodiment comprises an imidazole compound (imidazole curing accelerator). Examples of the imidazole compound include an imidazole substituted with an alkyl group and a benzimidazole. Use of the imidazole compound enables to obtain a compound having good fluidity and mold releasability. Also, the compound and a tablet made therefrom can exhibit long-term storage stability even in a high temperature and high humidity environment. Furthermore, in the case of using the compound or tablet as the material for an inductor, the resulting inductor exhibits excellent mechanical properties.

The imidazole compound is preferably an imidazole compound having an alkyl group with 8 or more carbon atoms, more preferably an imidazole compound having an alkyl group with 10 or more carbon atoms. By using an imidazole compound having an alkyl group with 8 or more carbon atoms, a compound having better fluidity is easily obtained, and the mechanical strength of the resulting molding tends to be capable of still further improvement.

Examples of commercial products of the imidazole compounds include 2MZ-H, C11Z, C17Z, 1,2DMZ, 2E4MZ, 2PZ-PW, 2P4MZ, 1B2MZ, 1B2PZ, 2MZ-CN, C11Z-CN, 2E4MZ-CN, 2PZ-CN, C11Z-CNS, 2P4MHZ, TPZ, SFZ (trade names, manufactured by Shikoku Kasei Kogyo Co., Ltd.). One of these may be used alone, or two or more of these may be used in combination.

The resin composition may contain curing accelerators other than the imidazole compound. The other curing accelerator is not particularly limited so long as it is a component which reacts with the epoxy resin to accelerate curing of the epoxy resin and may be a well-known curing accelerator.

The compounding amount of the curing accelerator in the compound according to the present embodiment may be a quantity with which the curing acceleration effect is acquired and is not particularly limited. However, from the viewpoint of improving the curability and fluidity of the resin composition, the compounding amount of the curing accelerator may be preferably 0.1 to 30 parts by mass, more preferably 1 to 15 parts by mass, relative to 100 parts by mass of the epoxy resin. It is preferable that curing accelerator content be 0.001 parts by mass or more and 5 parts by mass or less relative to 100 parts by mass of the total mass of the epoxy resin and the phenol resin. With a curing accelerator content of less than 0.001 parts by mass relative to the total mass of the epoxy resin and the phenol resin, it is difficult to obtain a sufficient effect of curing acceleration. With a curing accelerator content of more than 5 parts by mass, the storage stability of the compound tends to be reduced. However, even with a compounding amount and a content of the curing accelerator out of the above ranges, the effects of the present invention can be obtained.

The imidazole compound content in the compound according to the present embodiment may be preferably 0.1 to 3.0 parts by mass, more preferably 0.6 to 3.0 parts by mass, still more preferably 0.7 to 2.5 parts by mass, particularly preferably 0.8 to 2.0 parts by mass, relative to 100 parts by mass of the epoxy resin. With an imidazole compound content of 0.1 parts by mass or more, a sufficient curing acceleration effect is easily obtained, and the mechanical strength of a molding is easily further improved. With an imidazole compound content of 3.0 parts by mass or less, the storage stability of the compound is easily further improved. However, even with an imidazole compound content out of the range described above, the effects of the present invention can be obtained.

(Coupling Agent)

A coupling agent improves the adhesion between the resin composition and the metal element-containing powder, and can improve the flexibility and mechanical strength of a molding (e.g., an inductor) formed from the compound. The coupling agent may be, for example, at least one selected from the group consisting of a silane compound (silane coupling agent), a titanium-based compound, an aluminum compound (aluminum chelates), and an aluminum/zirconium-based compound. The silane coupling agent may be, for example, at least one selected from the group consisting of an epoxysilane, a mercaptosilane, an aminosilane, an alkylsilane, a ureidosilane, an acid anhydride-based silane and a vinylsilane. In particular, an epoxy-based silane coupling agent and an acid anhydride-based silane coupling agent are preferred. The compound may comprise one of the coupling agents described above, or may comprise a plurality of the coupling agents described above.

The coupling agent content in the compound according to the present embodiment is preferably 0.1 to 0.7 mass %, more preferably 0.2 to 0.6 mass %, still more preferably 0.3 to 0.5 mass %, based on the total mass of the compound. With a coupling agent content of 0.1 mass % or more, the flexibility and mechanical strength of a molding are easily further improved. With a coupling agent content of 0.7 mass % or less, blocking of the compound hardly occurs. However, even with an imidazole compound content out of the range described above, the effects of the present invention can be obtained.

The compounds may comprise a flame retardant to achieve environmental safety, recyclability, moldability and cost reduction of the compound. The flame retardant may be, for example, at least one selected from the group consisting of a brominated flame retardant, a phosphorus-based flame retardant, a metal hydroxide flame retardant, a silicone-based flame retardant, a nitrogen-containing compound, a hindered amine compound, an organic metal compound and an aromatic engineering plastic. The compound may comprise one of the flame retardants described above or may comprise a plurality of the flame retardants described above.

[Metal Element-Containing Powder]

The metal element-containing powder may contain, for example, at least one selected from the group consisting of an elemental metal, an alloy, and a metal compound. The metal element-containing powder may consist of, for example, at least one selected from the group consisting of an elemental metal, an alloy, and a metal compound. The alloy may comprise at least one selected from the group consisting of a solid solution, a eutectic and an intermetallic compound. The alloy may be, for example, a stainless steel (Fe—Cr alloy, Fe—Ni—Cr alloy, etc.). The metal compound may be, for example, an oxide such as ferrite. The metal element-containing powder may contain one metal element or a plurality of metal elements. The metal element contained in the metal element-containing powder may be, for example, a base metal element, a noble metal element, a transition metal element, or a rare earth element. The metal element contained in the metal element-containing powder may be, for example, at least one selected from the group consisting of iron (Fe), copper (Cu), titanium (Ti), manganese (Mn), cobalt (Co), nickel (Ni), zinc (Zn), aluminum (Al), tin (Sn), chromium (Cr), barium (Ba), strontium (Sr), lead (Pb), silver (Ag), praseodymium (Pr), neodymium (Nd), samarium (Sm) and dysprosium (Dy). The metal element-containing powder may contain an element other than the metal element. The metal element-containing powder may contain, for example, oxygen (O), beryllium (Be), phosphorus (P), boron (B), or silicon (Si). The metal element-containing powder may be a magnetic powder. The metal element-containing powder may be a soft magnetic alloy or a ferromagnetic alloy. The metal element-containing powder may be a magnetic powder consisting of, for example, at least one selected from the group consisting of an Fe—Si alloy, an Fe—Si—Al alloy (sendust), an Fe—Ni alloy (permalloy), an Fe—Cu—Ni alloy (permalloy), an Fe—Co alloy (permendur), an Fe—Cr—Si alloy (electromagnetic stainless steel), an Nd—Fe—B alloy (rare earth magnet), an Sm—Fe—N alloy (rare earth magnet), an Al—Ni—Co alloy (alnico magnet) and a ferrite. The ferrite may be, for example, a spinel ferrite (e.g., Mn—Zn ferrite, Ni—Zn ferrite, etc.), a hexagonal ferrite, or a garnet ferrite. The metal element-containing powder may be a copper alloy such as a Cu—Sn alloy, a Cu—Sn—P alloy, a Cu—Ni alloy, and a Cu—Be alloy. The metal element-containing powder may contain one of the elements and compositions described above or may contain a plurality of the elements and compositions described above.

The metal element-containing powder may be an elemental Fe. The metal element-containing powder may be an iron-containing alloy (Fe alloy). The Fe alloy may be, for example, an Fe—Si—Cr alloy or an Nd—Fe—B alloy. In the case where the compound contains at least one of elemental Fe and Fe alloy as the metal element-containing powder, it is easy to produce a molding having a high space factor and excellent magnetic properties from the compound. The metal element-containing powder may be an amorphous Fe alloy powder. In the case where the compound contains an amorphous Fe alloy powder as the metal element-containing powder, it is easy to produce a molding having still further excellent magnetic properties from the compound. As commercial product of the amorphous Fe alloy powder, for example, at least one may be used which is selected from the group consisting of AW2-08 and KUA-MET-6B2 (trade names, manufactured by Epson Atomics Corporation); DAP MS3, DAP MS7, DAP MSA10, DAP PB, DAP PC, DAP MKV49, DAP 410L, DAP 430L, and DAP HYB series (trade names, manufactured by Daido Steel Co., Ltd.); and MH45D, MH28D, MH25D, and MH20D (trade names, manufactured by Kobe Steel, Ltd.).

In the case of using the compound as material for an inductor, the particle diameter of the amorphous Fe alloy powder is not particularly limited so long as the shape of the inductor to be molded and the filling property on the coil are not hindered, and it is more preferable that at least one of the following conditions be satisfied. The more of the following conditions the amorphous Fe alloy powder satisfies, the more preferable it is.

First Condition

The amorphous Fe alloy powder has at least two peaks (hereinafter referred to as a first peak and a second peak) in the particle size distribution. In the present specification, the size relationship of the particle diameter is set to "first peak>second peak".

Second Condition

The particle diameter at the second peak is ½ or less (preferably ⅓ or less) of the particle diameter at the first peak. Also, as the lower limit value, the particle diameter at the second peak may be about 1/10 or more of the particle diameter at the first peak. As the particle size decreases, the surface area of the particles increases, which rather hinders the fluidity, and the limit is, therefore, estimated to be about 1/10.

Third Condition

The intensity ratio between the second peak and the first peak (ratio of abundance: second peak intensity/first peak intensity) is 0.2 or more and 0.6 or less (preferably 0.25 or more and 0.4 or less). The intensity ratio may be, for example, approximately 0.3.

Fourth Condition

The particle diameter at the first peak is dispersed around approximately 22 µm.

Fifth Condition

The D90% of the particle size distribution is approximately 60 µm or less.

The shape of the metal element-containing powder is not particularly limited. The individual metal element-containing powders may be, for example, spherical, flat or needle-like. The metal element-containing powder may contain a plurality of types of metal element-containing powders with different elements contained and may contain a plurality of types of metal element-containing powders different in average particle diameter.

The metal element-containing powder content in the compound according to the present embodiment may be 90 mass % or more, preferably 92 mass % or more, and more preferably 94 mass % or more, based on the total mass of the compound. Also, the metal element-containing powder content may be preferably 99.8 mass % or less, more preferably 98 mass % or less, still more preferably 96 mass % or less, based on the total mass of the compound. With a metal element-containing powder content of 90 mass % or more, a molding having excellent magnetic properties can be easily produced, so that an inductor having excellent inductor properties can be formed, and the mechanical strength of the molding is further improved. With a metal element-containing powder content of 99.8 mass % or less, the fluidity of the compound and the mechanical strength of the molding are easily further improved. However, even with a metal element-containing powder content of more than the upper limit value described above, the effects of the present invention can be obtained.

The resin composition content in the compound according to the present embodiment is preferably 0.2 to 10 mass %, more preferably 2 to 8 mass %, still more preferably 4 to 6 mass %, based on the total mass of the compound. With such a content, all of the moldability (fluidity) of the compound and the tablet, the high strength of the resulting inductor and the inductor characteristics can be achieved at a high level.

[Manufacturing Method of Compound]

In the step of manufacturing the compound, any technique can be applied so long as the resin composition can be attached and formed on the surface of the metal element-containing powder. For example, by mixing the metal element-containing powder and the resin composition while heating, the resin composition adheres to the surface of the metal element-containing powder and covers the metal element-containing powder, so that the compound can be obtained. The resin composition contains an epoxy resin, a phenol resin and an imidazole compound as described above, which are kneaded together with a wax while heating to soften the resin, so that the wax and the other components of the resin composition can be attached and formed on the surface of the metal element-containing powder. The formation of a homogeneous resin composition containing wax on the surface of the metal element-containing powder enables to obtain a compound excellent in moldability (fluidity) and mold releasability which causes less occurrence of molding burrs and a tablet made therefrom.

As the kneading method, a kneading method using a kneader or a stirrer can be used. In the kneading, a metal element-containing powder, a resin such as an epoxy resin, a curing agent such as a phenol resin, a curing accelerator such as an imidazole compound, a wax, and a coupling agent may be kneaded in a tank. After the metal element-containing powder and the coupling agent are fed and mixed in the tank, the resin, the curing agent, the curing accelerator, and the wax may be fed into the tank for kneading of the raw materials in the tank. Also, after kneading of the resin, the curing agent, the wax, and the coupling agent in the tank, the curing accelerator may be fed in the tank for further kneading of the raw material in the tank. Alternatively, after preparation of a mixture powder of the resin, the curing agent, the curing accelerator, and the wax (resin mixture powder) in advance and subsequent preparation of a metal mixture powder of the metal element-containing powder and a coupling agent by kneading, the metal mixture powder and the resin mixture powder may be then kneaded.

The time for kneading by a kneader is, for example, preferably 5 minutes or more, more preferably 10 minutes or more, and still more preferably 20 minutes or more, though depending on the volume of the tank and the production volume of the compound. Also, the time for kneading by a kneader is preferably 120 minutes or less, more preferably 60 minutes or less, still more preferably 40 minutes or less. With a kneading time of less than 5 minutes, kneading is insufficient, so that the moldability of the compound is impaired, and the curing degree of the compound is liable to vary. With a kneading time of more than 120 minutes, for example, the curing of the resin composition (e.g., an epoxy resin and a phenol resin) proceeds in a tank, so that the fluidity and moldability of the compound is easily impaired. In the case of kneading raw materials in a tank with a kneader while heating, the heating temperature is not limited, as depending on the composition of the resin composition. The heating temperature is, for example, preferably 50° C. or more, more preferably 60° C. or more, still more preferably 80° C. or more. The heating temperature is preferably 150° C. or less, more preferably 120° C. or less, still more preferably 110° C. or less. With a heating temperature in the range described above, the resin composition in the tank is easily softened to cover the surface of the metal element-containing powder, and the curing of the resin composition during kneading is easily suppressed.

[Manufacturing Method of Tablet]

A predetermined mold is filled with the compound, and a pressure is applied thereto for forming, so that a tablet can be formed. The shape and size of the tablet are not particularly limited. For example, in the case where the tablet has a cylindrical shape, the diameter of the tablet may be 5 mm or more, and the height (length) of the tablet may be 5 mm or more. In manufacturing of the tablet, the molding pressure may be, for example, preferably 500 MPa or more, more preferably 1000 MPa or more, still more preferably 2000 MPa or more.

[Manufacturing Method of Inductor]

An inductor can be formed through steps such as a transfer molding of the compound or the tablet. The higher the molding pressure is, the higher the strength favorably becomes. In the case of transfer molding, it is preferable that molding be performed at a molding pressure of 500 to 2500 MPa, and it is more preferable that molding be performed at a molding pressure of 1400 to 2000 MPa in consideration of mass productivity and mold life. The density of a pressed compact may be preferably 75% or more and 86% or less, more preferably 80% or more and 86% or less, relative to the true density of the particles of the compound. In the case where the density of the pressed compact of the compound or the tablet is 75% or more and 86% or less relative to the true density of the particles of the compound, an inductor having good magnetic properties and high mechanical strength can be manufactured.

[Glass Transition Temperature of Cured Resin Product Suitable for Inductor]

It is preferable that the glass transition temperature of the resin cured product formed by curing the resin composition is preferably 150° C. or more, more preferably 160° C. or more. A glass transition temperature of the resin cured product of 150° C. or more enables to easily obtain an excellent inductor with less reduction in strength even under a high temperature and severe environment. In the present invention, the glass transition temperature means the temperature at which tan δ reaches a peak in dynamic viscoelasticity measurement.

[Bending Strength of Cured Compound Product]

The bending strength at a temperature of 150° C. of a cured product obtained by curing the compound is preferably 40 MPa or more, more preferably 43 MPa or more, still more preferably 45 MPa or more. With a bending strength of the cured product at a temperature of 150° C. of 40 MPa or more, an inductor having a high mechanical strength at high temperature can be obtained. Incidentally, the bending strength can be measured by a three-point bending test of a molding formed into a rod shape with 100 mm×10 mm×3 mm.

[Storage Stability]

The compound according to the present embodiment has excellent storage stability. The storage stability in the present invention means having only a small change in bending strength and flexural strength of an inductor (a pressed compact after heat treatment) manufactured from the compound stored for a predetermined time. It can be said that the severer the environment for storage is, or the longer the storage time is, the higher the storage stability is. In the case assuming a practical environment, for example, having a storage stability of about 5 days in a high temperature and high humidity environment at 40° C./90%-RH is suitable for practical use, and having a storage stability of about 2 weeks is a level at which an actual product can be mass-produced without problem.

EXAMPLES

The present invention is described in further detail as follows with reference to Examples, though the present invention is not limited thereto only.

Example 1

[Preparation of Compound and Tablet]

In the tank of a biaxial pressure kneader, 517 g of KUAMET 6B2 (trade name, manufactured by Epson Atomics Corporation) as an amorphous Fe alloy, 423 g of SQ-I (trade name, manufactured by BASF SE) as a carbonyl iron powder, 4.75 g of KBM-403 (trade name, 3-glycidoxypropyltrimethoxysilane, manufactured by Shin-Etsu Chemical Co., Ltd.) as a silane coupling agent were placed and kneaded at room temperature (about 25° C.) for 20 minutes.

Separately, 34.3 g of NC 3000-H (trade name, biphenyl aralkyl-type epoxy resin, manufactured by Nippon Kayaku Co., Ltd., epoxy equivalent: 290, softening point: 70° C., melt viscosity: 0.03 Pa·s (150° C.)) as a crystalline epoxy resin, 12.8 g of HP-850N (trade name, phenol novolac resin, manufactured by Hitachi Chemical Co., Ltd., hydroxyl equivalent: 108) as a phenol resin (curing agent), 0.343 g of C11Z-CN (trade name, 1-(2-cyanoethyl)-2-undecylimidazole, manufactured by Shikoku Chemicals Corporation) as a curing accelerator, and 8.0 g of Licowax E (trade name, montanic acid ester, manufactured by Clariant Chemicals Co., Ltd.) as a wax were mixed in a plastic container and added to the tank of the kneader described above, and the mixture was heated such that the temperature in the tank reached 80° C., and kneaded for 30 minutes.

The resulting compound mass was subjected to natural cooling and crushed into compound powder. The compound powder was placed in a forming mold having a diameter of 13 mm and a height of 13 mm and pressurized at 2000 MPa to obtain a tablet with a cylindrical shape.

Examples 2 to 4

Compounds and tablets were prepared in the same manner as in Example 1 except that the combinations and compounding amounts of the epoxy resin, phenol resin, curing accelerator, wax, silane coupling agent, and metal element-containing powder were changed as shown in Table 1. The epoxy resin used in Examples 2 and 4 is a crystalline epoxy resin YX-4000H (trade name, biphenyl-type epoxy resin, manufactured by Mitsubishi Chemical Corporation, epoxy equivalent: 192, softening point: 105° C., melt viscosity: 0.003 Pa·s (150° C.)). In Examples 3 and 4, AW2-08 (trade name, manufactured by Epson Atomics Corporation) was additionally used as the amorphous Fe alloy.

Comparative Examples 1 to 3

Compounds and tablets were prepared in the same manner as in Example 1 except that the combinations and compounding amounts of the epoxy resin, phenol resin, curing accelerator, wax, silane coupling agent, and metal element-containing powder were changed as shown in Table 1. The epoxy resin used in Comparative Example 1 is a non-crystalline epoxy resin EXA 4750 (trade name, naphthalene-type epoxy resin, manufactured by DIC Corporation, epoxy equivalent: 162, softening point: 86° C., melt viscosity 0.045 Pa·s (150° C.)). The curing accelerator used in Comparative Example 2 is PX-4PB (trade name, tetra(n-butyl)phosphonium tetraphenylborate, manufactured by Nippon Chemical Industrial Co., Ltd.). The wax used in Comparative Example 3 is carnauba wax (manufactured by Toa Kasei Co., Ltd., trade name: Carnauba Wax Fine Powder Type).

[Evaluation of Fluidity]

The fluidity at the time of transfer molding using the tablets obtained in Examples and Comparative Examples was evaluated by spiral flow. A transfer tester was charged with 100 g of tablets to perform transfer molding under conditions with a mold temperature of 150° C., a molding pressure of 5 MPa, and a forming time of 180 seconds, and the amount of spiral flow during that time was measured in the unit of mm. The amount of spiral flow is the length of the path through which the liquefied tablets flow (flow distance of liquefied tablets) in a spiral (Archimedes spiral) groove formed in the mold. More easily the tablets liquefied by heating flow, the larger the amount of spiral flow is. In other words, the amount of spiral flow of the tablets (compounds) excellent in fluidity is large. As the transfer tester, a 100-KN transfer molding machine (PZ-10 type) manufactured by Kodaira Seisakusho Co., Ltd. was used. The results are shown in Table 2.

[Evaluation of Mold Releasability]

When a molded product obtained by spiral flow was detached from a mold for spiral flow measurement, the mold release conditions were visually observed to evaluate a molding with good releasability as A, and a molding with poor releasability as B. The results are shown in Table 2.

[Evaluation of Molding Burr]

The state of burrs of a molded product obtained by spiral flow was visually observed to measure the seeping width in the part having a largest burr in the unit of mm. The results are shown in Table 2.

[Evaluation of Strength of Cured Product]

The compounds obtained in Examples and Comparative Examples were formed into plate-shaped pressed compacts having a length of 100 mm, a width of 10 mm and a thickness of 2 mm, at a molding pressure of 2000 MPa using a hydraulic press. The resulting plate-shaped pressed compact was cured by heating at a temperature of 180° C. in a nitrogen gas ($N_2$) atmosphere for 10 minutes to prepare a test piece (cured product) for the evaluation of strength. Subsequently, a load was applied to the test piece in the thickness direction, and the breaking strength (MPa) was calculated from the maximum value of the load when the test piece broke. The results are shown in Table 2.

TABLE 1

| Material | Product name | Example 1 | Example 2 | Example 3 | Example 4 | Comparative Example 1 | Comparative Example 2 | Comparative Example 3 |
|---|---|---|---|---|---|---|---|---|
| Epoxy resin | NC3000-H | 34.3 | — | 27.0 | — | — | — | — |
|  | YX-4000H | — | 30.1 | — | 23.7 | — | 30.1 | 30.1 |
|  | EXA4750 | — | — | — | — | 31.5 | — | — |
| Phenol resin | HP-850N | 12.8 | 16.9 | 10.0 | 13.3 | 15.5 | 16.9 | 16.9 |
| Curing accelerator | C11Z-CN | 0.343 | 0.301 | 0.270 | 0.237 | 0.315 | — | 0.301 |
|  | PX-4PB | — | — | — | — | — | 0.301 | — |
| Wax | Licowax E | 8.0 | 8.0 | 8.0 | 8.0 | 8.0 | 8.0 | — |
|  | Carnauba wax | — | — | — | — | — | — | 8.0 |
| Coupling agent | KBM-403 | 4.75 | 4.75 | 4.75 | 4.75 | 4.75 | 4.75 | 4.75 |
| Amorphous iron alloy powder | KUAMET6B2 | 517 | 517 | 713 | 713 | 517 | 517 | 517 |
|  | AW2-08 | — | — | 76 | 76 | — | — | — |
| Carbonyl iron powder | SQ-I | 423 | 423 | 162 | 162 | 423 | 423 | 423 |
| Metal element-containing powder content (mass %) |  | 94.0 | 94.0 | 95.0 | 95.0 | 94.0 | 94.0 | 94.0 |

TABLE 2

| Item | Unit | Example 1 | Example 2 | Example 3 | Example 4 | Comparative Example 1 | Comparative Example 2 | Comparative Example 3 |
|---|---|---|---|---|---|---|---|---|
| Spiral flow | mm | ≥1000 | ≥1000 | ≥1000 | ≥1000 | 450 | 500 | 800 |
| Mold releasability | — | A | A | A | A | B | B | B |
| Molding burr | mm | ≤2 | ≤2 | ≤2 | ≤2 | ≤2 | ≤2 | 7 |
| Strength of cured product | MPa | 48 | 52 | 46 | 50 | 15 | 18 | 26 |

As can be seen from the results shown in Table 2, it was confirmed that any of the compounds and tablets in Examples 1 to 4 has a larger spiral flow and more excellent fluidity, with better mold releasability, less amount of molding burrs, and higher strength of the resulting cured product, compared with the compounds and tablets in Comparative Examples 1 to 3.

INDUSTRIAL APPLICABILITY

The compound according to the present invention and the tablet made therefrom are excellent in transfer moldability, having excellent mold releasability with less molding burrs. The inductor obtained by using the compound according to the present invention and the tablet made therefrom has a high strength with excellent durability. Use of such compound and the tablet enables to provide a high-performance inductor excellent in durability with good productivity, having a high industrial value. Also, the compound and the tablet according to the present invention can be used not only for an inductor but also as a raw material of various industrial products such as electromagnetic shields and bonded magnets.

The invention claimed is:

1. A compound comprising:
   a resin composition comprising an epoxy resin, a phenol resin, a wax, and an imidazole compound; and
   a metal element-containing powder,
   wherein the epoxy resin comprises a crystalline epoxy resin,
   wherein a content of the wax is 0.3 to 1.2 mass % based on the total mass of the compound, and the wax comprises a montanic acid ester, and
   wherein a content of the metal element-containing powder is 90 mass % or more based on the total mass of the compound.

2. The compound according to claim 1, wherein the crystalline epoxy resin comprises at least one selected from the group consisting of a biphenyl-type epoxy resin and a biphenyl aralkyl-type epoxy resin.

3. The compound according to claim 1, wherein the metal element-containing powder comprises an amorphous Fe alloy powder.

4. The compound according to claim 1, wherein the imidazole compound comprises an imidazole compound having an alkyl group with 8 or more carbon atoms.

5. The compound according to claim 1, wherein the content of the wax is 0.4 to 1.0 mass % based on the total mass of the compound.

6. The compound according to claim 1, wherein the content of the wax is 0.5 to 0.9 mass % based on the total mass of the compound.

7. The compound according to claim 1, wherein the content of the metal element-containing powder is 92 mass % or more based on the total mass of the compound.

8. The compound according to claim 1, wherein the content of the metal element-containing powder is 94 mass % or more based on the total mass of the compound.

9. The compound according to claim 1, wherein the content of the metal element-containing powder is 90 mass % or more and 99.8 mass % or less based on the total mass of the compound.

10. The compound according to claim 1, wherein the content of the metal element-containing powder is 98 mass % or less based on the total mass of the compound.

11. The compound according to claim 1, wherein the content of the metal element-containing powder is 96 mass % or less based on the total mass of the compound.

12. The compound according to claim 1, wherein the crystalline epoxy resin comprises at least one selected from the group consisting of a biphenyl-type epoxy resin and a biphenyl aralkyl-type epoxy resin, the metal element-containing powder comprises an amorphous Fe alloy powder, and the imidazole compound comprises an imidazole compound having an alkyl group with 8 or more carbon atoms.

13. The compound according to claim 1, wherein the compound is used for an inductor.

14. The compound according to claim 1, wherein the compound is used for transfer molding.

15. A tablet formed by using the compound according to claim 1.

* * * * *